(12) United States Patent
Blasingame et al.

(10) Patent No.: US 6,598,920 B1
(45) Date of Patent: *Jul. 29, 2003

(54) DIFFERENTIAL ACTION RAILROAD CAR WHEELSET

(76) Inventors: Thomas W. Blasingame, P.O. Box 1532, Boise, ID (US) 83701; Robert E. Hord, 302 Albemarle Ave., Richmond, VA (US) 23226

( * ) Notice: Subject to any disclaimer, the term of this patent is extended or adjusted under 35 U.S.C. 154(b) by 0 days.

This patent is subject to a terminal disclaimer.

(21) Appl. No.: 09/582,898
(22) PCT Filed: Jan. 7, 1999
(86) PCT No.: PCT/US99/00341
§ 371 (c)(1),
(2), (4) Date: Jul. 6, 2000
(87) PCT Pub. No.: WO99/34988
PCT Pub. Date: Jul. 15, 1999

(51) Int. Cl.$^7$ .............................................. B60B 37/10
(52) U.S. Cl. .................. 295/37; 295/44; 105/218.1; 246/255
(58) Field of Search .................. 295/37, 44; 246/63, 246/194, 255; 191/63; 105/218.1

(56) References Cited

U.S. PATENT DOCUMENTS

| | | | | |
|---|---|---|---|---|
| 12,572 A | * | 3/1855 | Prentiss | |
| 50,579 A | * | 10/1865 | Harris | |
| 1,141,406 A | | 6/1915 | Ollard | |
| 1,355,575 A | * | 10/1920 | Sederholm | |
| 3,537,058 A | * | 10/1970 | Ferraz | |
| 4,575,145 A | * | 3/1986 | Wolfram et al. | 295/37 |
| 5,373,791 A | * | 12/1994 | Bach et al. | 104/288 |
| 5,501,417 A | * | 3/1996 | Capan | 246/63 R |
| 5,884,956 A | * | 3/1999 | Pasquin | 295/37 |
| 6,007,126 A | * | 12/1999 | Blasingame et al. | 295/37 |
| 6,048,015 A | * | 4/2000 | Blasingame | 295/44 |

* cited by examiner

*Primary Examiner*—Russell D. Stormer

(57) ABSTRACT

A railroad car wheelset (10) has an axle (12) with one wheel rigidly attached as in conventional railroad practice. This wheel (10) is permitted to rotate by means of journal bearings either on the extreme ends of the axle (12) or inboard of each wheel location (14A and 14B). At the location of the other wheel, the axle (12) is provided with a smooth surface and a self-lubricating bearing (24) is provided as a pant of a hub (20) on the axle (12). The axle (12) shaft is provided with a boss (18) or other means of preventing the independently rotating wheel from migrating laterally out of proper alignment A self-lubricating thrust bearing (32) is located between this boss (18) and the side of the wheel to eliminate any possible galling between the two moving surfaces. A removable retainer plate (46) is located on the other side of the independently rotating wheel to prevent the wheel from moving laterally in that direction. Adjacent the removable retainer plate (46) is an electrical contactor which can conduct an electrical current from the wheel to the axle shaft, to permit the wheelset (10) to properly operate railway signals or other systems dependent on electrical continuity. In lieu of the self-lubricating bearings, the bearings can be comprised of a lubricant coating permanently bonded to the bearing surface of the hub (20) adjacent the independently rotatable wheel. An alternate embodiment uses a separate hub (60) press-fit on the axle.

1 Claim, 8 Drawing Sheets

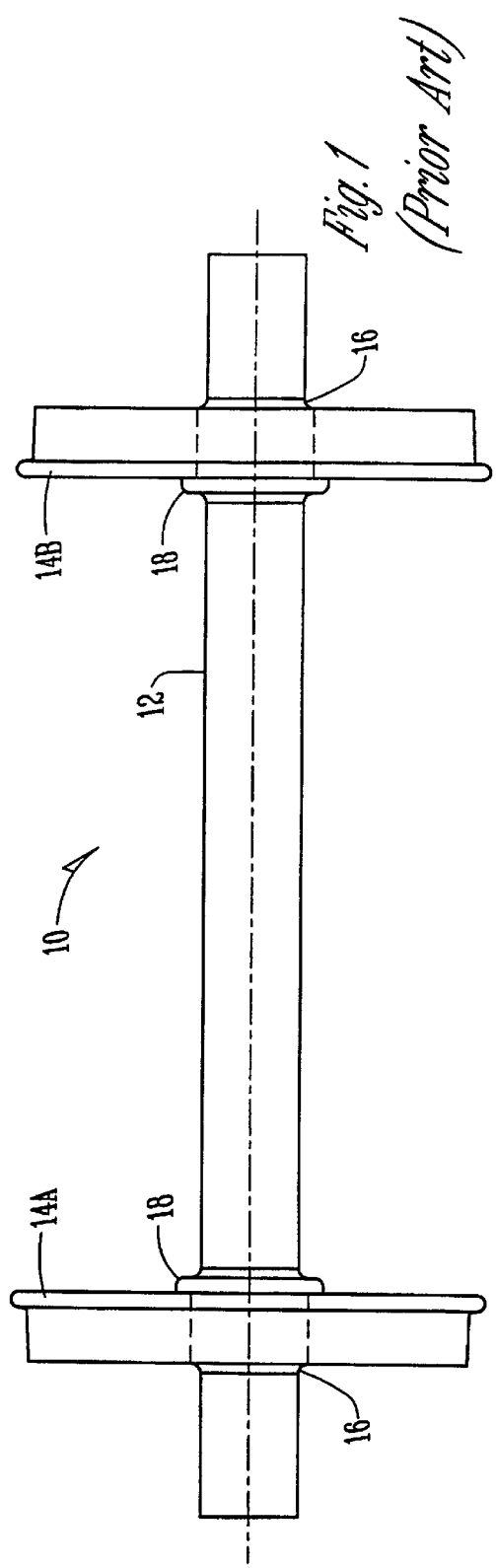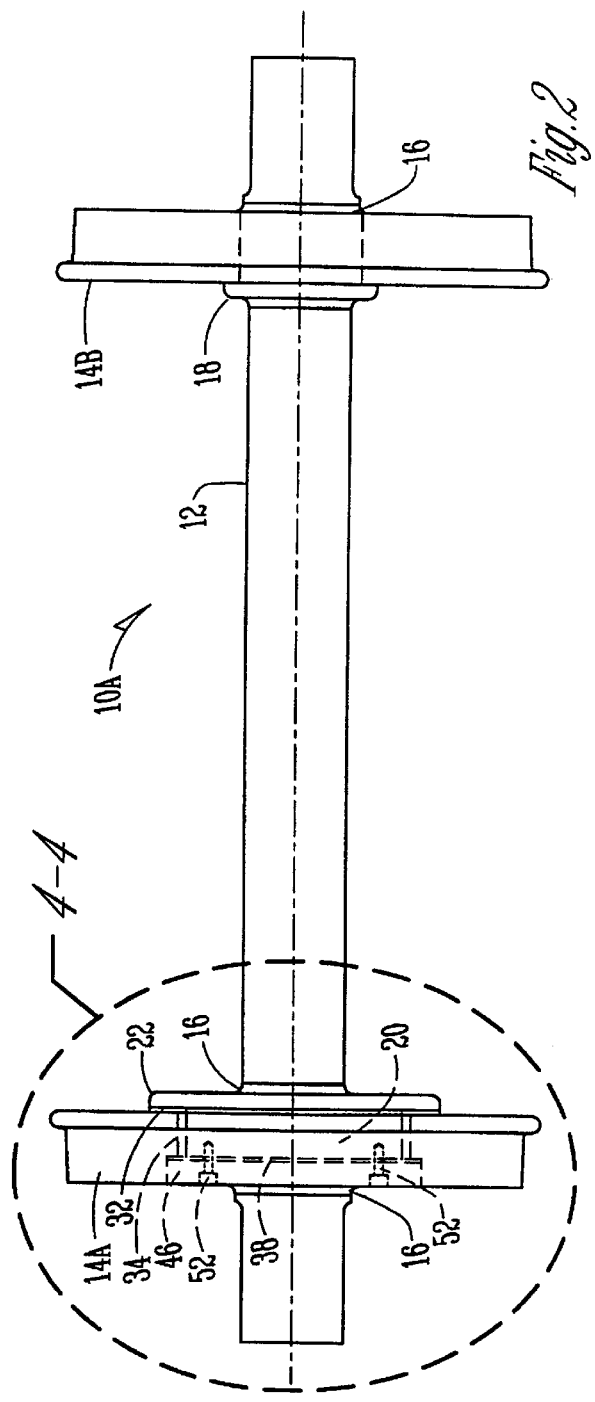

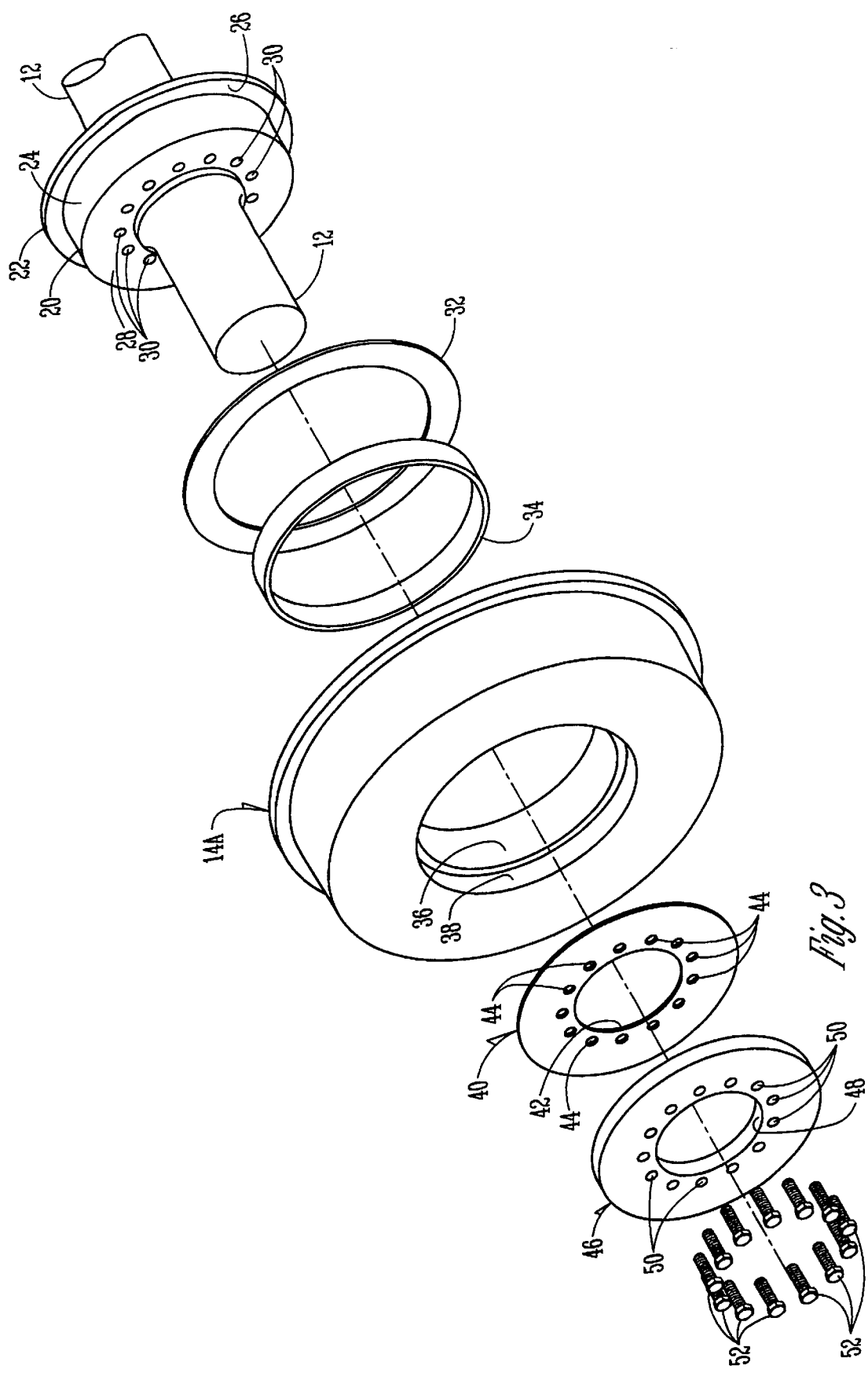

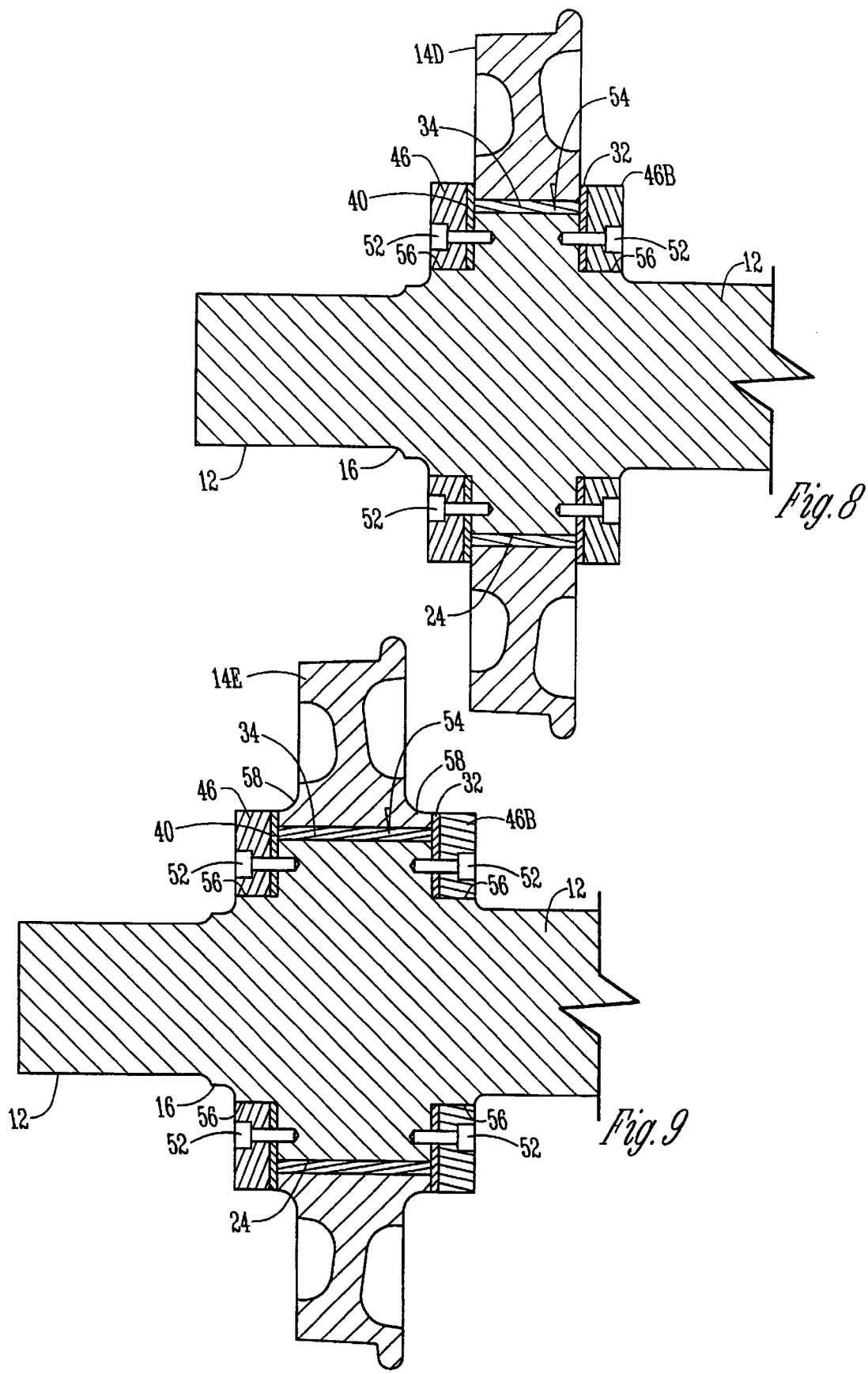

DIFFERENTIAL ACTION RAILROAD CAR WHEELSET

BACKGROUND OF THE INVENTION

Wheelsets for railroad cars are usually comprised of an axle and two wheels. The wheels are pressed on to the axle shaft and are rigidly mounted so that both wheels turn exactly the same degree of rotation during operation. The wheelset assembly may be supported by journal bearings outboard of each wheel or the bearings may be located inboard of the wheels. The rigid assembly of the wheels on the axle and the lack of independent rotation of the wheels is the cause of slippage on the rail when the wheelset operates in curved sections of track. This slippage causes wear on the wheel treads and rails and is a prime cause of corrective maintenance on both the wheels and the track.

Efforts have been made to overcome the problems associated with the rigid assembly of conventional wheelsets by placing bearings between the axle and the wheel on at least one end of the axle to permit differential speeds of rotation of the wheels at opposite ends of the axle. In such cases, a hub is located on at least one end of the axle and a wheel is mounted on the hub or on the axle and its rotation with respect to the axle is facilitated by a bearing assembly. As discussed hereafter, electrical continuity from the two rails through the wheels and the axle is necessary for operation of signal devices or the like. This electrical continuity was established with the conventional railroad wheelsets wherein the wheels were rigidly fixed through opposite ends of the axle. However, with the advent of one of the wheels being mounted on the axle by means of a bearing assembly, the electrical continuity between the wheels was less than perfect. With the advent of non-metal bearings, the electrical continuity was not possible.

A typical signal device for a road crossing, for example which utilizes a crossing arm, flashing lights, and the like, derives electrical energy from any conventional source. A low voltage is imposed on a given dedicated length of rail on opposite sides of the signal, with the opposite rail being electrically connected to the signal whereupon the signal circuit is closed when the wheel assembly of a train initially moves onto the dedicated length of rail. The circuit is completed between the opposite rails through the wheels and axle of the train's wheel assemblies which allow the flow of energy therethrough to electrically connect the opposite rails.

The wheels are conventionally secured to hubs that are integral with the axles. These integral hubs require a single billet of material which is large in diameter and which requires substantial machining to achieve correct final dimensions, which is expensive.

It is a therefore a principal object of this invention to provide a railroad wheelset with independent rotation of wheels with respect to each other which will consistently retain the electrical continuity between the opposite wheels and the rails upon which they are supported.

A further object of this invention is to provide a wheelset with independent rotation of the wheels with respect to each other which can be used in existing truck designs without modification to the truck structures or the braking system.

A still further object of this invention is to provide a railroad wheelset which requires no additional maintenance than conventional rigid wheelsets after installation and during service.

A still further object of this invention is to provide a railroad wheelset with independently rotating wheels in which the differential action is made available with no decrease in safety or reliability.

A still further object of this invention is to provide a railroad car wheelset with independent wheel rotation which can be economically manufactured and applied to railroad cars of all types.

A still further object of this invention is to provide a railroad car wheelset with independent wheel rotation wherein the bearings for the independently rotatable wheel is comprised of a lubricating coating.

A still further object of this invention is to provide press-on hubs for the axles in lieu of integral hubs.

These and other objects will be apparent to those skilled in the art.

SUMMARY OF THE INVENTION

The railroad car wheelset of the present invention includes an axle with one wheel rigidly attached as in conventional railroad practice. This wheel is permitted to rotate by means of journal bearings either on the extreme ends of the axle or inboard of each wheel location. At the location of the other wheel, the axle is provided with a smooth surface and a self-lubricating bearing is provided. The axle shaft is provided with a boss or other means of preventing the independently rotating wheel from migrating laterally out of proper alignment. A self-lubricating thrust bearing is located between this boss and the side of the wheel to eliminate any possible galling between the two moving surfaces. A removable retainer plate is located on the other side of the independently rotating wheel to prevent the wheel from moving laterally in that direction. Adjacent the removable retainer plate is an electrical contactor which can conduct an electrical current from the wheel to the axle shaft, to permit the wheelset to properly operate railway signals or other systems dependent on electrical continuity. In lieu of the self-lubricated bearings, the bearings can be comprised of a lubricant coating permanently bonded to the bearing surface of the hub adjacent the independently rotatable wheel. The hubs are either integral with the axle, or pressed on the axle.

BRIEF DESCRIPTION OF THE DRAWINGS

FIG. 1 is an elevational view of a conventional prior art railroad wheelset;

FIG. 2 is an elevational view of the preferred embodiment of the railway wheelset of the present invention;

FIG. 3 is an exploded view of the components within the line 4—4 of FIG. 2;

FIG. 8 is a sectional view similar to that of FIG. 7 but shows a second embodiment of this invention;

FIG. 9 is a sectional view similar to that of FIG. 8 but shows a third embodiment of this invention;

DESCRIPTION OF THE PREFERRED EMBODIMENT

Figure 4:
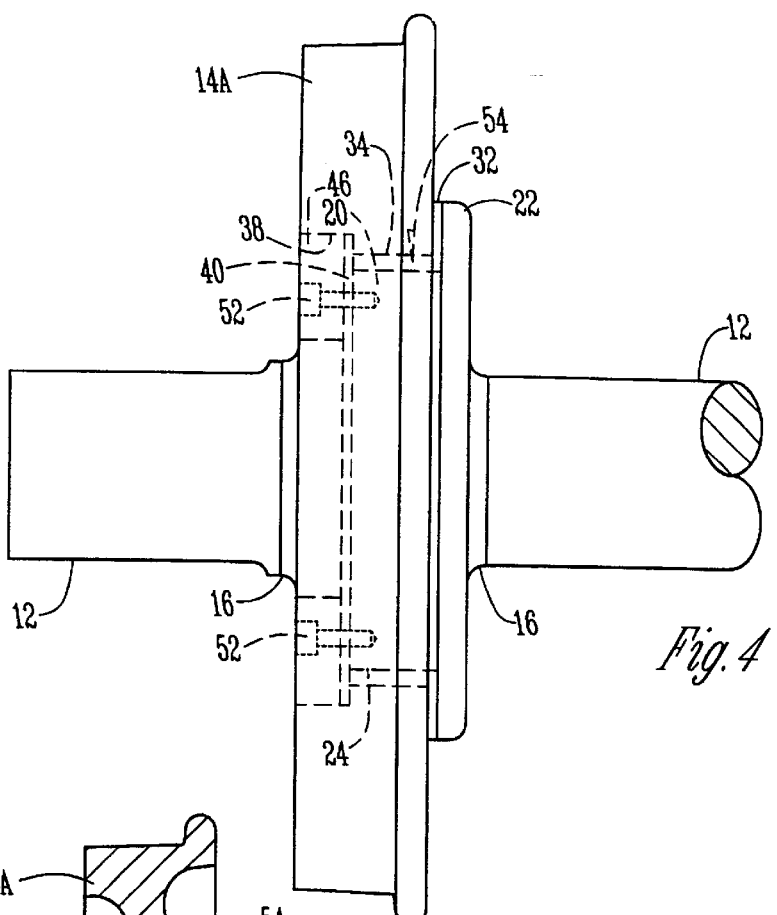
FIG. 4 is an enlarged scale view of the components contained within the line 4—4 of FIG. 2.

The conventional prior art wheelset 10 is shown in FIG. 1 and is comprised of the horizontal axle 12 with wheels 14A and 14B adjacent its opposite ends. The wheels 14A and 14B are each rigidly secured to axle 12 by being pressed on the axle up against bosses 18, respectively.

The preferred embodiment of this invention is shown in FIGS. 2, 3, 4 and 5. With reference to FIG. 2, the right-hand wheel 14B is affixed to the axle 12 in the same manner that wheel 14B was secured to the axle 12 in FIG. 1. However, at the other end of axle 12 in FIG. 2, a hub 20 is integral with the axle 12. Hub 20 has an annular flange 22 of increased diameter. With reference to FIG. 3, hub 20 has a cylindrical bearing surface 24 and a vertical bearing surface 26 adjacent thereto. A vertical circular face 28 on hub 20 has a plurality of threaded apertures 30.

Figure 5:
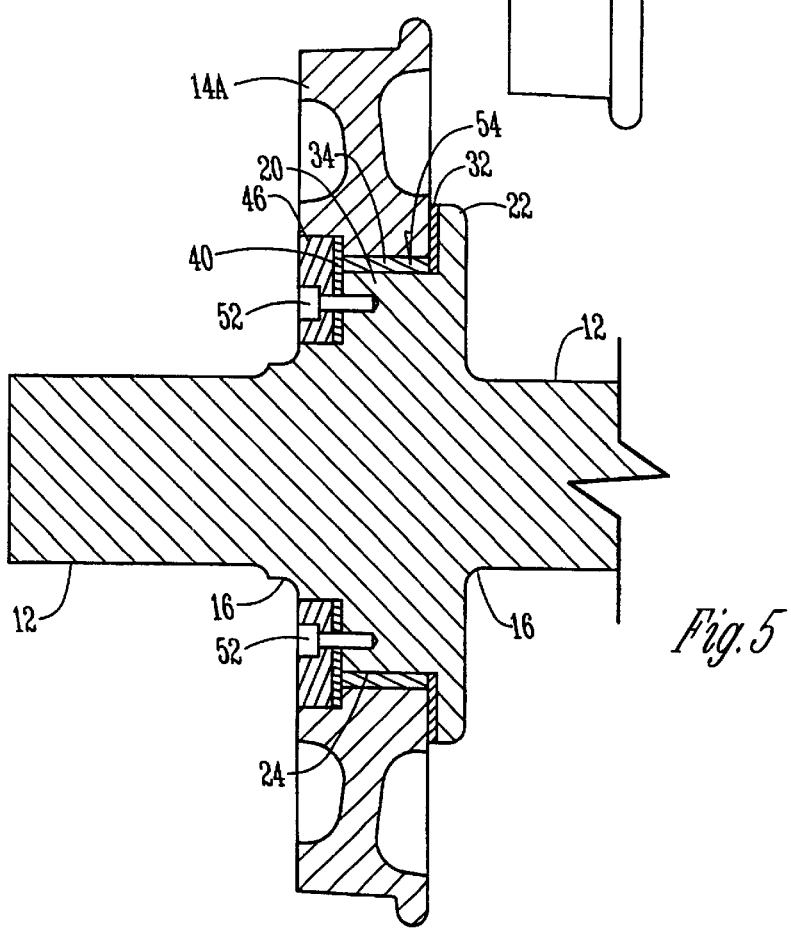
FIG. 5 is a transverse sectional view of the structure of FIG. 4.

A cylindrical flat planar thrust bearing 32 is mounted on bearing surface 24 and when assembled, bears against bearing surface 26. A cylindrical sleeve bearing 34 is then mounted on bearing surface 24 adjacent the thrust bearing 32. In assembly, the wheel 14A which has a large diameter center bore 36 is slidably mounted on the sleeve bearing 34 (FIG. 5). The center bore 36 of wheel 14A has an annular groove 38 on the outboard side thereof. A circular metal conductor plate 40 with the center opening 42 and a plurality of apertures 44 (equal in number and size to apertures 30 in face 38 of hub 20) is mounted within annular groove 38. A retainer plate 46 (FIGS. 3 and 5) is also mounted in annular groove 38. Retainer plate 46 has a center opening 48 and a plurality of apertures 50. Conventional threaded bolts 52 extend through the registering apertures 50 (in retainer plate 46); 44 (in conductor plate 40); and 30 (in hub 20).

It should be noted (FIG. 4) that a space 54 exists between the bearing surface 24 of hub 20 and the center opening or bore 36 in wheel 14A. This space is normally occupied by sleeve bearing 34. However, in a modified form of the invention, the space 54 can be filled with a lubricating coating (not shown), in lieu of the sleeve bearing 34. Wheel bore 36 can be adjusted in diameter as required.

There are available in the industry synergistic coatings (e.g., Hi-T-Lube®) which become an integral part of the top layer of a base metal rather than merely a surface cover. This lubricating coating has a hard interface metal layer adjacent the base metal; a semi-soft, compressible metal layer adjacent the base metal; a semi-soft, compressible metal layer adjacent the hard interface layer; a hard, thin oxide layer adjacent the compressible layer; and an outer malleable, dry lubricant layer on the outer surface of the thin oxide layer. This lubricating layer can resist wear of the base metal by up to 15 times under cryogenic conditions. This and other lubricating coatings in the industry in environments from room temperature up to 1000 degrees Fahrenheit can withstand high applied loads at relatively high speeds and frequent reversal in direction. Under such conditions, these products performed effectively for long periods of time where other lubricants and combinations of materials failed in a relatively short period of time. The thickness of the coating (and the radial height of space 54) can be in the order of 0.0003 inches–0.001 inches in thickness and has a coefficient of friction in the range of 0.03 and can withstand high compression loads in excess of 150,000 psi. Hardness of available material is up to an equivalent of Rc 55.–$R_c$85.

These materials are not, per se, a part of this invention and have not been previously used in the application of bearings for railway wheelsets but the present invention makes provision for this technology.

Figure 7:
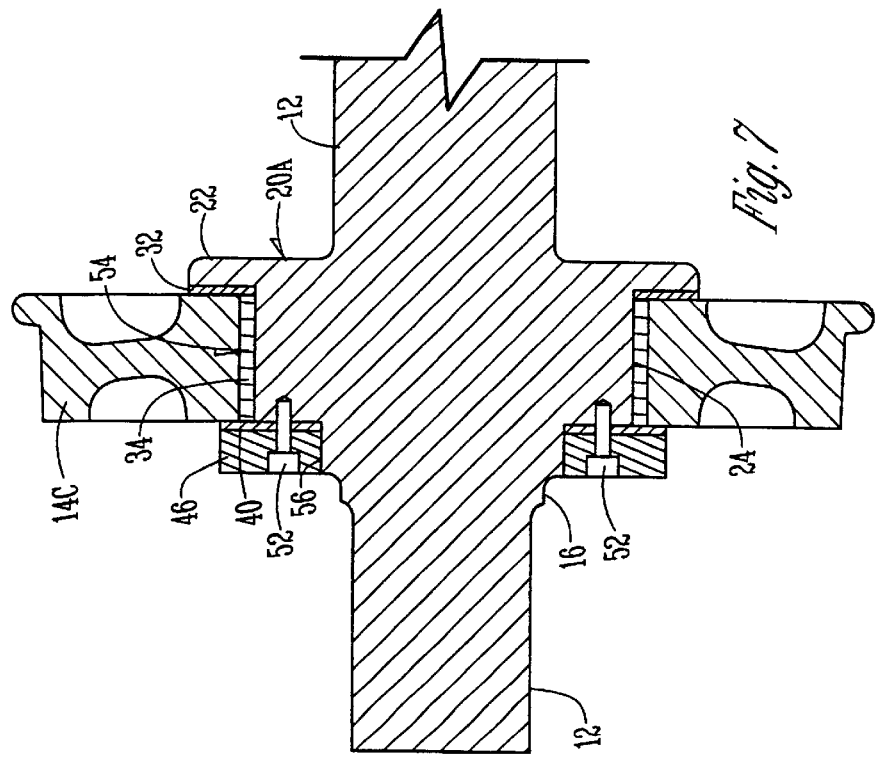
FIG. 7 is a sectional view similar to that of FIG. 5 but shows a first alternative form of the invention.
Figure 6:
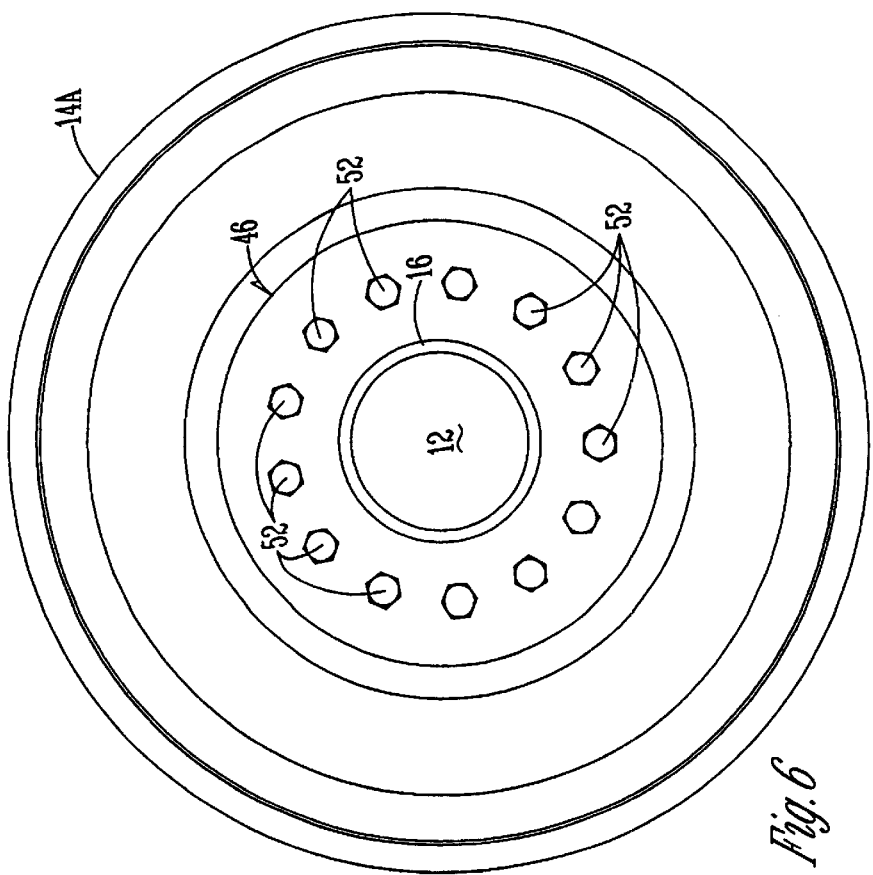
FIG. 6 is an elevational view of the structure of FIG. 4 as viewed from the left-hand side of FIG. 4.

FIG. 7 shows a first alternate embodiment of this invention wherein a railway wheel 14C does not have an annular groove 38 as was the case in the preferred embodiment, but has only an enlarged bearing surface 24 whereupon the conductor plate 40 is mounted on the outboard surface of wheel 14C and is held in place by retainer plate 46. Both the conductor plate 40 and the retainer plate 46 (FIG. 7) are mounted on an extended outer shoulder 56 of hub 20A. Thus, the principal difference between the embodiment of FIG. 7 and the embodiment of FIG. 5 is that the retainer plate 46 and the conductor plate 40 are located on the outboard side of wheel 14C rather than in an annular groove within the wheel as was the case with wheel 14A in FIGS. 4 and 5.

A second alternative embodiment of the invention is shown in FIG. 8 where a pair of annular shoulders 56 extend outwardly from hub 20, with the conductor plate 40 and identical retainer plates 46 and 46B being mounted on both sides of the wheel 14D on the shoulders 56. Retainer plate 46B can be made in two pieces to facilitate assembly.

The third alternative embodiment of this invention is shown in FIG. 9 which is similar to the structure of FIG. 8 except that the wheel 14E in FIG. 9 has a pair of exterior annular shoulders 58 on opposite sides thereof to combine with the shoulders 56 of the structure of FIG. 8 thereby increasing the effective width of the hub to create a much stronger wheel section and increased bearing area.

It should be understood that the space 54 normally occupied in each of the embodiments by a bearing sleeve 34 could be occupied by the lubricating coating described heretofore instead of the sleeve bearing 34.

Figure 10:
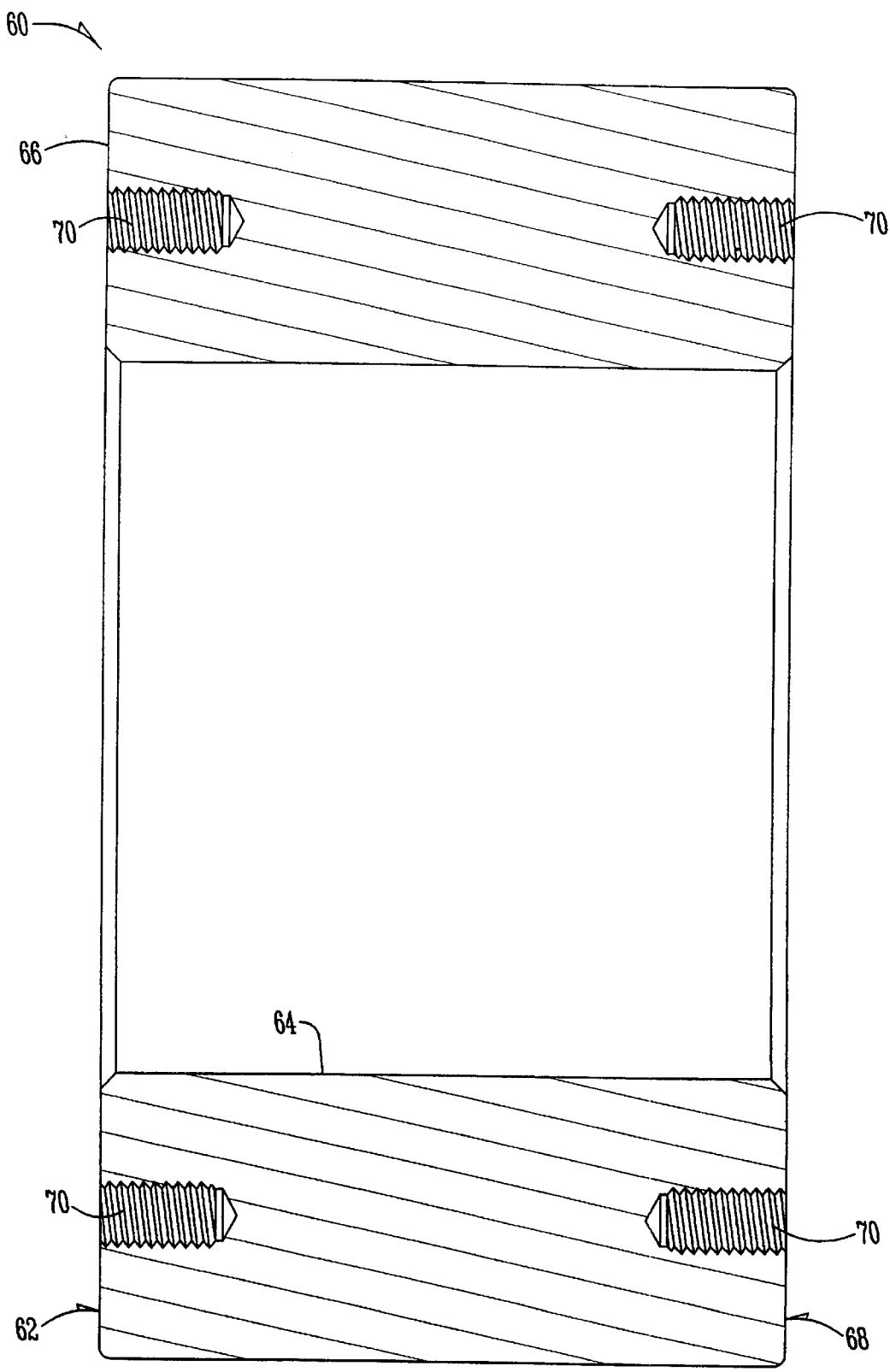
FIG. 10 is a sectional view through an alternate press-on hub that is pressed on the axle.
Figure 11:
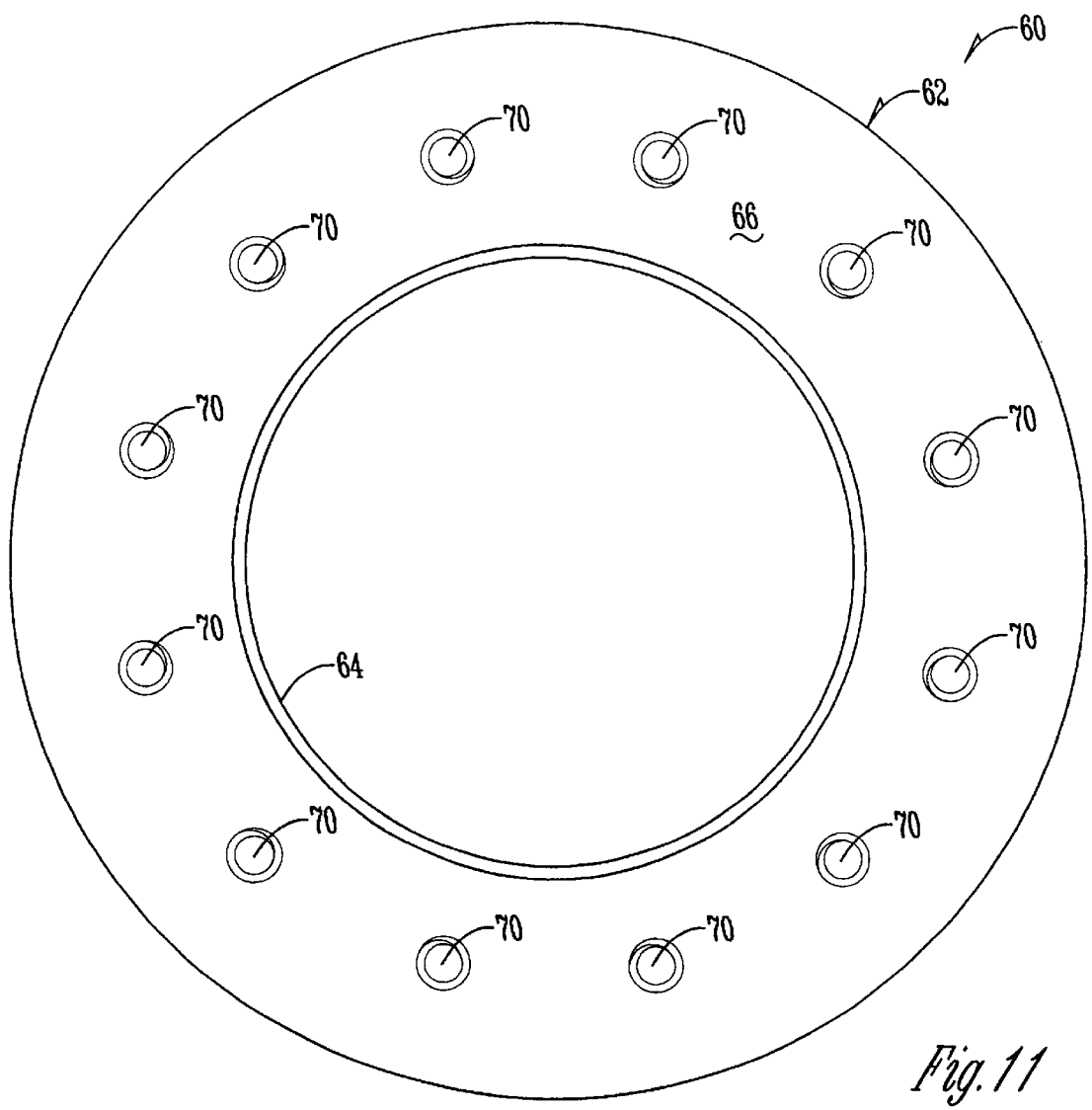
FIG. 11 is an end elevational view of the hub shown in FIG. 11.
Figure 12:
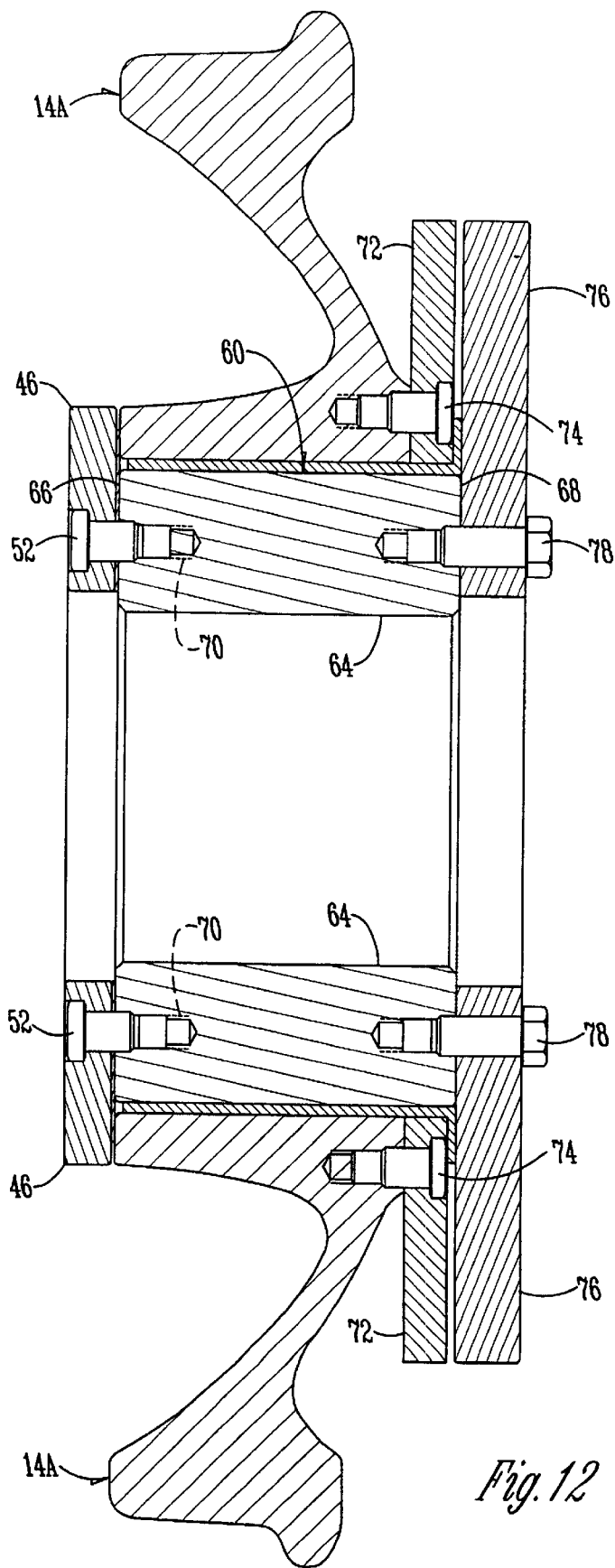
FIG. 12 is a sectional view through an axle wheel assembly using the hub of FIGS. 10 and 11.

A third alternate form of the invention is shown in FIGS. 10–12. A press-on hub 60 has a cylindrical body 62, an inner bore 64, opposite faces 66 and 68, and a plurality of threaded apertures 70 in each of the faces (FIGS. 10 and 13). The diameter of bore 64 frictionally receives the outer diameter of an axle which is force-fit within bore 64. The hub 60 is shown in assembled condition in FIG. 12 on shaft 12.

An inner clutch plate 72 (FIG. 12) is bolted to the inner face of wheel 14A by bolts 74. An outer clutch plate 76 is bolted to the inner face 68 of hub 60 by bolts 78.

Among the advantages of press-on hubs 60 are the following:

1. They are less expensive than integral hubs because much machining is eliminated.
2. Hubs 60 reduce the diameter of the axle, which further reduces cost.
3. Most parts can be identical for all wheel diameters with hubs 60.
4. The hubs 60 can be replaced without replacing the axle.
5. The hubs 60 can be made of different material than the axle, and different suppliers of hubs are then available for a given axle.

It is therefore seen that the wheelsets of this invention can be easily assembled and can easily create a wheelset with a single rigid wheel at one end of the axle and an independently rotatable wheel at the other end of the axle. The electrical continuity through the wheelset is guaranteed by the presence of conductor plate 40 which can maintain this electrical continuity without having to pass through the wheel bearings themselves. With reference to FIG. 2, the electrical continuity between the rails upon which wheels 14A and 14B are mounted is completed from the rail under wheel 14B through wheel 14B and thence through axle 12, through conductor plate 40, and into wheel 14A to the opposite rail. All the disadvantages of integral hubs are overcome by press-on hubs.

It is therefore seen that this invention will achieve at least all of its stated objectives.

What is claimed is:

1. A railroad car wheelset, comprising: an axle shaft, equipped with one or more independently rotatable wheels, said axle shaft to have provisions for mounting retainers on each side of said independently rotatable wheels to prevent lateral motion in either direction, a lubricated industrial coating on said axle shaft and/or the independently rotatable wheels in lieu of separate bearings, a lateral motion retainer on one side of each independently rotatable wheel, and an electrical contactor between each independently rotatable wheel and the other retainer to provide electrical conductivity through the independently rotatable wheels to the axle shaft.

* * * * *